US009208084B2

(12) United States Patent
Kapil et al.

(10) Patent No.: US 9,208,084 B2
(45) Date of Patent: Dec. 8, 2015

(54) EXTENDED MAIN MEMORY HIERARCHY HAVING FLASH MEMORY FOR PAGE FAULT HANDLING

(75) Inventors: Sanjiv Kapil, Cupertino, CA (US); Ricky C. Hetherington, Pleasanton, CA (US)

(73) Assignee: Oracle America, Inc., Redwood Shores, CA (US)

( * ) Notice: Subject to any disclaimer, the term of this patent is extended or adjusted under 35 U.S.C. 154(b) by 508 days.

(21) Appl. No.: 12/493,779

(22) Filed: Jun. 29, 2009

(65) Prior Publication Data

US 2010/0332727 A1 Dec. 30, 2010

(51) Int. Cl.
G06F 12/00 (2006.01)
G06F 12/02 (2006.01)
G06F 12/10 (2006.01)
G06F 12/08 (2006.01)

(52) U.S. Cl.
CPC ............... *G06F 12/08* (2013.01); *G06F 12/10* (2013.01); *G06F 2212/202* (2013.01); *G06F 2212/205* (2013.01); *G06F 2212/2022* (2013.01); *Y02B 60/1225* (2013.01)

(58) Field of Classification Search
CPC . G06F 12/08; G06F 12/0638; G06F 12/0893; G06F 2212/202; G06F 2212/2022; G06F 2212/205
See application file for complete search history.

(56) References Cited

U.S. PATENT DOCUMENTS

| 5,899,994 | A | 5/1999 | Mohamed et al. | |
|---|---|---|---|---|
| 6,418,516 | B1 | 7/2002 | Arimilli et al. | |
| 7,269,708 | B2 | 9/2007 | Ware | |
| 2004/0044838 | A1* | 3/2004 | Nickel et al. | 711/104 |
| 2005/0235131 | A1 | 10/2005 | Ware | |
| 2007/0101098 | A1 | 5/2007 | Shin et al. | |
| 2007/0106853 | A1 | 5/2007 | Evanchik et al. | |
| 2008/0052463 | A1* | 2/2008 | Chitlur et al. | 711/118 |
| 2009/0313416 | A1* | 12/2009 | Nation | 711/100 |

FOREIGN PATENT DOCUMENTS

WO 2009/048707 4/2009
WO 2009048707 4/2009

OTHER PUBLICATIONS

International Search Report in application No. PCT/US2010/040263 mailed Oct. 22, 2010.

(Continued)

*Primary Examiner* — Yaima Rigol
(74) *Attorney, Agent, or Firm* — Meyertons Hood Kivlin Kowert & Goetzel; Erik A. Heter

(57) ABSTRACT

A computer system with flash memory in the main memory hierarchy is disclosed. In an embodiment, the computer system includes at least one processor, a memory management unit coupled to the at least one processor, and a random access memory (RAM) coupled to the memory management unit. The computer system may also include a flash memory coupled to the memory management unit, wherein the computer system is configured to store at least a subset of a plurality of pages in the flash memory during operation. Responsive to a page fault, the memory management unit may determine, without invoking an I/O driver, if a requested page associated with the page fault is stored in the flash memory and further configured to, if the page is stored in the flash memory, transfer the page into RAM.

16 Claims, 8 Drawing Sheets

(56) References Cited

OTHER PUBLICATIONS

Office Action from Chinese Patent Application 201080035941.9, mailed Dec. 24, 2013, Chinese and English versions, pp. 1-17.

Office Action from European Application No. 10733065.6, dated Feb. 12, 2014, pp. 1-6.
Office Action from Chinese Application No. 201080035941.9, issued Sep. 1, 2014, English and Chinese versions, pp. 1-29.

* cited by examiner

EXTENDED MAIN MEMORY HIERARCHY HAVING FLASH MEMORY FOR PAGE FAULT HANDLING

BACKGROUND OF THE INVENTION

1. Field of the Invention

This invention relates to computer systems, and more particularly, to memory organization in computer systems.

2. Description of the Related Art

Because memory space in computer systems is limited while the desire for memory space is unlimited, various techniques may be employed to extend the apparent size of a main memory in a given computer system. One such technique is the use of virtual memory, wherein main memory may be augmented with storage space on a disk. Moreover, certain virtual memory schemes may utilize overlays known as pages, wherein an address space may be partitioned into equal sized blocks. These blocks may be swapped between a disk storage system and main memory as needed during operation of a computer system. Some virtual memory schemes may also utilize segments, wherein blocks of an address space are partitioned into blocks of varying sizes.

In computer systems using virtual memory, virtual memory addresses may need to be mapped to physical memory addresses. When a request for an access is made, the request may be issued in terms of the virtual memory address. The virtual memory address may then be translated into a physical address in order to determine the physical location at which the requested information is stored. Information providing mapping between virtual address and physical addresses (i.e. address translations) may be tracked via the use of either a page table or translation storage buffer (TSB). A page table or TSB may be a data structure stored in main memory that includes virtual-to-physical address translations.

A higher-level cache known as a translation lookaside buffer (TLB) may also be used to store virtual-to-physical address translations. When a processor issues a virtual address in conjunction with a memory request, a TLB may be searched to determine whether or not an associated address translation is stored therein. If the address translation is stored in the TLB, known as a 'TLB hit' (and the requested data is not stored in a cache), the processor may then access the data from the physical address indicated by the address translation. If the address translation is not stored in the TLB (a 'TLB miss'), then the processor may access the page table or TSB in main memory and search of the translation.

If the search of the page table or TSB finds a valid address translation (indicating that the corresponding page is residing in main memory), the processor may repeat the memory request, accessing the data at the indicated physical address. On the other hand, if the search of the page table or TSB does not find a valid address (indicating that the page does not reside in main memory), an exception known as a page fault may be generated. Responsive to the page fault, the page containing the requested data may be loaded into main memory from disk storage (and the requested data may also be loaded into at least one cache residing between the main memory and the processor's execution core). Accessing a page of virtual memory from a disk storage system may include asserting an interrupt to a processor and invoking I/O driver software in order to access the disk storage system, and more generally, the I/O hierarchy of the computer system. After the page has been loaded into main memory from the disk storage system, the processor may repeat the request, accessing the data from at least main memory (if not from a higher level cache) as a result of the repeated request.

Accordingly, the miss penalty incurred resulting from a page fault may have a significantly greater latency than for accesses to data from memory (or a higher level cache) where no page fault occurs. In recent years, solid-state drives (SSD's) have been used to reduce some of the latency associated with a miss penalty. An SSD may utilize flash memory or other type of storage that may be significantly faster than typical disk storage. The SSD may be placed in the I/O hierarchy, and upon a page fault, driver software for accessing the SSD may be invoked. However, since SSD accesses may be faster than disk storage, the miss penalty incurred from a page fault may be reduced.

SUMMARY OF THE INVENTION

A computer system is disclosed. In one embodiment, the computer system includes at least one processor, a memory management unit coupled to the at least one processor, and a random access memory (RAM) coupled to the memory management unit. The computer system may also include a flash memory coupled to the memory management unit, wherein the computer system is configured to store at least a subset of a plurality of pages in the flash memory during operation. Responsive to a page fault, the memory management unit may determine, without invoking an I/O driver, if a requested page associated with the page fault is stored in the flash memory and further configured to, if the page is stored in the flash memory, transfer the page into RAM.

A method for operating a computer system is also contemplated. In one embodiment, the method includes a processor initiating a memory request in order to access data and determining if a page containing the data is stored in a random access memory (RAM) coupled to a memory management unit. If the page containing the requested data is stored in RAM, the requested data may be provided to the processor. If the page containing the requested data is not stored in RAM, a determination may be made, without invoking an I/O driver (and without generating an interrupt in some cases) as to whether the page containing the data is stored in flash memory. If the page is stored in flash memory, the page may be transferred to the RAM and the request may be repeated.

In general, a system and method of operating the system are contemplated wherein flash memory is incorporated into the main memory hierarchy. The flash memory may be separate from flash memory that may be used to implement a solid state disk (SSD) in the I/O hierarchy (or any device in the I/O hierarchy). For a virtual address space having a plurality of pages, some (if not all) of the pages may be stored in the flash memory, with certain ones of the pages being stored in main memory as needed. When a page containing data requested by a processor or execution core is not stored in main memory, thereby causing a page fault, a memory management unit may respond by retrieving the particular page from the flash memory, without invoking an I/O driver to access the page from storage, and furthermore, without generating an interrupt to a processor or execution core. Since the memory management unit may handle the page fault without invoking an I/O driver to access storage in the I/O hierarchy, or without generating an interrupt, the performance penalty associated with the page fault may be significantly reduced, even if the system utilizes an SSD instead of a traditional hard disk drive.

BRIEF DESCRIPTION OF THE DRAWINGS

Other aspects of the invention will become apparent upon reading the following detailed description and upon reference to the accompanying drawings in which.

Figure 1:
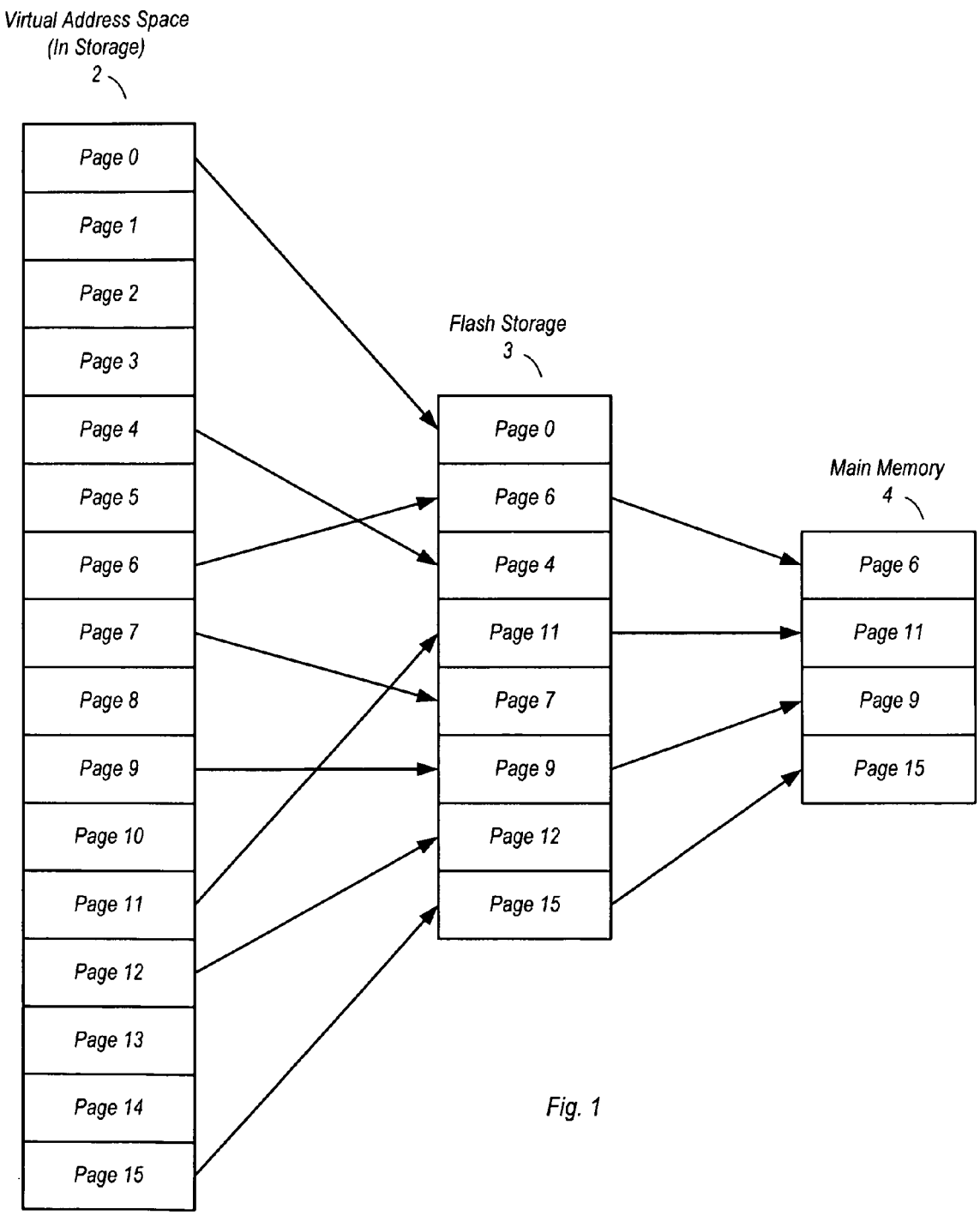
FIG. 1 is a diagram illustrating a paging scheme for one embodiment of a computer system.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling within the spirit and scope of the present invention as defined by the appended claims.

DETAILED DESCRIPTION OF THE INVENTION

As a preliminary note, references to the term "data" as used herein are intended to include any type of binary information. For example, data may refer to data used as operands in execution of an instruction, result data generated from the execution of instructions, and/or the instructions themselves. The term "data" may also encompass various types of tags, bits, and so forth that are used to indicate attributes of other types of binary information. In general, the term "data" as used herein may refer to any type of binary information that may be stored, transferred, or operated on in a computer or other type of digital system.

Turning now to FIG. 1, a diagram illustrating a paging scheme for one embodiment of a computer system is shown. In the embodiment shown, a virtual address space 2 used to augment a main memory 4 is shown as having a plurality of pages, i.e. page 0-page 15. The number of pages of virtual address space 2 may vary from one embodiment to the next, and may be limited only by the size of the storage in which the virtual address space is contained. Furthermore, the size of the pages in virtual address space 2 may also vary from one embodiment to the next. Exemplary page sizes may include (but are not limited to) pages of 1024 bytes, 2048 bytes, 4096 bytes, and so forth. Generally speaking, the size of a given page may be any chosen number of bytes that is suitable as a page size in a given embodiment. The storage used to store the pages of the virtual address space may a hard disk storage device, a solid state disk (SSD) storage device, or other suitable storage device.

During operation of a computer system, various pages may be swapped into and out of main memory 4. This may be necessitated by virtue of main memory 4 having less storage capacity than the storage device in which the virtual address space 2 is stored. When data from a given page is needed for operation of a computer system in which memory 4 is implemented, that page may be moved into main memory 4, replacing another page which may be purged from main memory 4. The size of main memory 4 may also vary from one embodiment to another, and thus the embodiment shown here (which is shown as storing 4 pages) should be considered exemplary.

In the embodiment shown, flash storage 3 is located between the virtual address space 2 and main memory 4. Flash storage 3 may be part of the main memory hierarchy that also includes main memory 4, and may further be separate from the I/O hierarchy that includes the storage device in which virtual address space 2 is contained. As illustrated in the embodiment of FIG. 1, flash storage 3 may also be used to store pages. In some embodiments, flash storage 3 may be used to store a subset of the pages of virtual address space 2. However, embodiments are possible and contemplated wherein flash storage 3 is of sufficient storage capacity to store all of the pages of virtual address space 2. Since flash storage 3 stores pages, a page fault (i.e. when a page associated with a memory request is not stored in main memory 4) may result in a requested page being access from flash memory 3 instead of virtual address space 2. For example, if Page 4 in the embodiment shown is associated with a memory request, it may be swapped into main memory 4 from flash storage 3 instead of from the storage device in which virtual address space 2 is contained.

As will be explained in further detail below, accessing pages from flash storage 3 responsive to a page fault may significantly reduce the performance penalty associated with the same. Since flash storage 3 in the embodiment shown is part of the main memory hierarchy instead of being part of the I/O hierarchy (as a hard disk drive or SSD may be), the amount of time to transfer the page associated with a memory request may be significantly reduced.

Prior art computer system may handle page faults by swapping pages between a disk storage device and main memory. This may in turn require a processor to service an interrupt and an I/O driver to be invoked in order to enable access to the disk storage device. However, since flash storage 3 in the embodiment shown is part of the main memory hierarchy instead of the I/O hierarchy, accesses thereto may be performed without generating interrupts or causing I/O drivers to be invoked (as may be necessary to access a disk storage in the I/O hierarchy). Thus, some (if not all) page faults may be handled without generating an interrupt and/or the invoking of an I/O driver as may be necessary to access a storage device in the I/O hierarchy. Such an arrangement may significantly reduce the performance penalty associated with page faults, and in turn, may enhance computer system performance.

Figure 2:
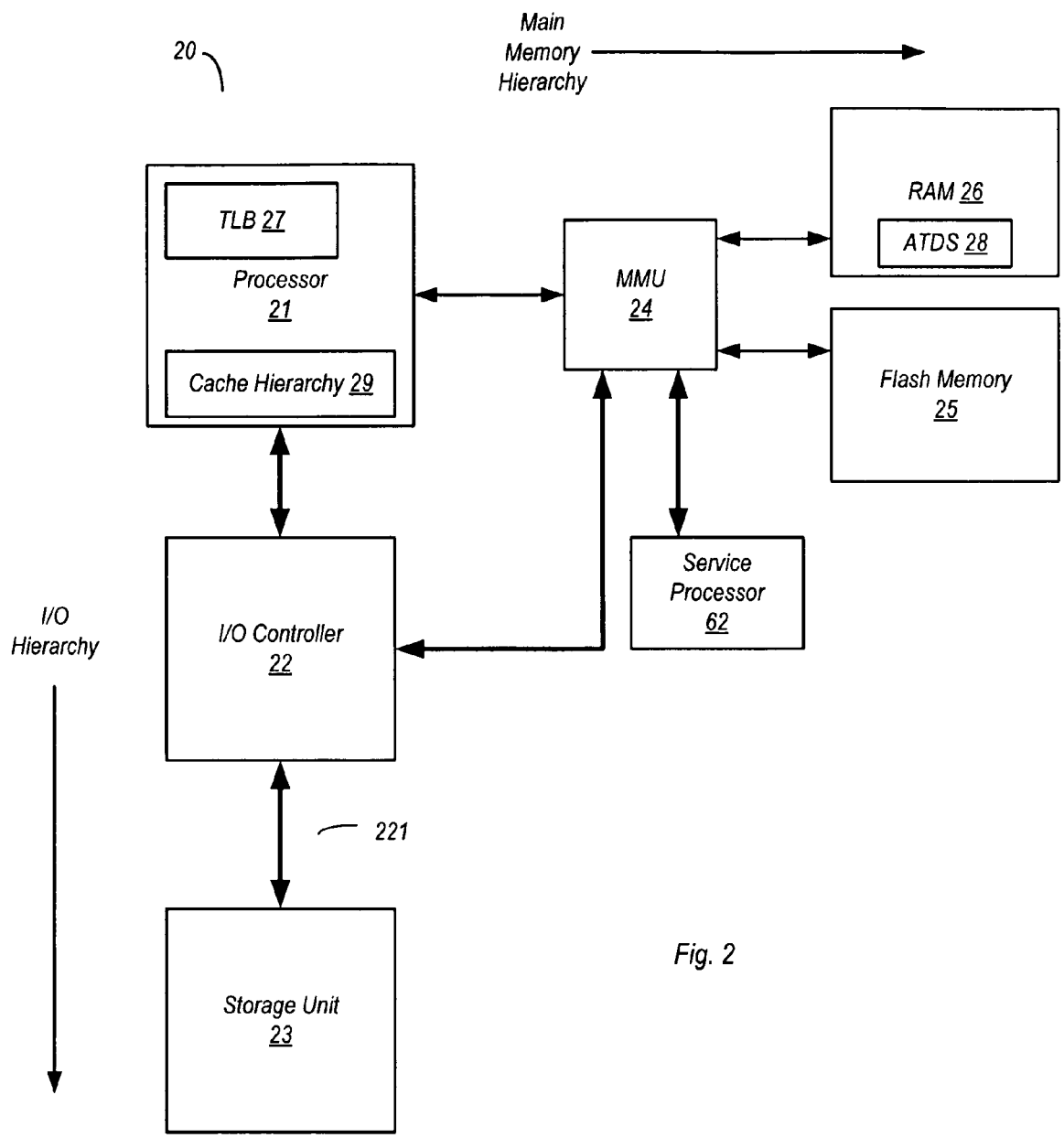
FIG. 2 is a block diagram of one embodiment of a computer system.

FIG. 2 is a block diagram of one embodiment of a computer system. In the embodiment shown, computer system 20 includes a processor 21 coupled to both a main memory hierarchy and an I/O hierarchy. The main memory hierarchy in this embodiment includes memory management unit (MMU) 24, random access memory (RAM) 26, and flash memory 25. The I/O hierarchy in this embodiment includes I/O controller 22 and storage unit 23. RAM 26 may be any type of RAM that may be used for main memory, including, but not limited to DRAM (dynamic RAM), DDR RAM (double data rate RAM), SRAM (static RAM), and so on.

Processor 21 may be one of several different processor architectures. These processor architectures include, but are not limited to, SPARC, the Power architecture, X86, Alpha, and so forth. In some embodiments, processor 21 may be a single core processor, while in other embodiments processor 21 may be a multi-core processor. In multi-core embodiments, processor 21 may be a symmetric multi-core processor or an asymmetric multi-core processor.

In the embodiment shown, processor 21 includes a cache memory for storing address translations, translation lookaside buffer (TLB) 27. TLB 27 may store a number of different entries that provide a mapping between virtual addresses (of the virtual address space) and physical addresses (actual physical address in main memory, or RAM 26 in this embodiment). Responsive to a memory access request, TLB 27 may be searched for virtual-to-physical address translation information corresponding requested data. If corresponding translation information is found in TLB 27, and the data is not cached, the data may be accessed from the indicated physical address in RAM 26. If corresponding address translation information is not found, but the data is subsequently accessed from RAM 26, address translation information corresponding to the data may be loaded into TLB 27.

In the embodiment shown, processor 21 includes a cache hierarchy 29, which may include one or more cache memories. Such cache memories may be used to store frequently accessed data and/or instructions in order to enhance the performance of processor 21. A hierarchy of caches may include a high level L1 cache, an L2 cache that is lower in the hierarchy than the L1 cache, and so forth. In general, higher level caches may provide for faster access than lower level caches, although higher level caches may also be smaller than lower level caches. In some embodiments, processor 21 may also include an L0 cache, which may be smaller and faster than an L1 cache (which may in turn be smaller and faster than an L2 cache, and so forth). The various levels of caches may include instruction caches (cache memories designated for the storage of instructions), data caches (cache memories designated for the storage of data, e.g., operands) and unified caches that may store both data and instructions. For example, in one embodiment, processor 21 may include an L1 cache that is a unified cache and separate L2 caches for data and instructions.

When an execution core of processor 21 asserts a request for data, the various levels of cache hierarchy 29 may be searched for the requested data. In some embodiments, the various cache memories of cache hierarchy 29 may be searched concurrently with each other. If the requested data is found in one of the levels of cache memory in cache hierarchy 29, then the data may be provided to the execution core without accessing main memory. TLB 27 may also be searched responsive to a memory request. The search of TLB 27 may be performed concurrently with the searching of the various cache memories of cache hierarchy. Alternatively, the search of TLB 27 may be performed subsequent to a search of the cache memories of cache hierarchy 29, responsive to determining that the requested data is not stored in the cache. If the requested data is not stored in a cache of cache hierarchy 29, but address translation information corresponding to the requested data is found in TLB 27, processor 21 may access RAM 26 using the address translation information to locate the data. The data may then be provided to the requesting execution core, and may also be loaded into one or more cache memories of cache hierarchy 29.

In the embodiment shown, MMU 24 is configured to perform various control functions related to flash memory 25 and RAM 26. These control functions may include (but are not limited to) controlling the flow of data between processor 21 and either of flash memory 25 or RAM 26. MMU 24 may also control the migration of data between flash memory 25 and RAM 26, and perform other functions, including those related to the handling of page faults, as will be discussed in further detail below. In this embodiment, MMU 24 is also coupled to I/O controller 22 to enable DMA (direct memory access) functionality.

RAM 26 may be used as main memory for computer system 20. More particularly, RAM 26 may provide general storage for data associated with programs that are being executed by one or more execution cores of processor 21. Such programs may include operating system software, application programs, and other programs that may be invisible to a user of computer system 20. The data stored in RAM 26 may be organized into pages as discussed above in reference to FIG. 1.

RAM 26 may also be used to store an address translation data structure (ATDS) 28. In one embodiment, ATDS 28 may be a translation storage buffer (TSB). A TSB may be a contiguous data structure that stores address translations and is organized in a manner similar that of a direct mapped cache. Moreover, when implemented as a TSB, ATDS 28 may act as a second level cache to TLB 27. In another embodiment, ATDS 28 may be a page table. A page table may be a data structure similar to a TSB in that is may store address translation information for pages that are stored in RAM 26. Page tables may also store information about pages that are not residing in memory at a given time.

If an execution core of processor 21 asserts a request for data that is not stored in a cache in cache hierarchy 29 and is not associated with an entry stored in TLB 27, ATDS 28 may be accessed to determine if the requested data is stored in RAM 26, and if so, where (i.e. at what address). More particularly, ATDS 28 may be accessed to determine if a page containing the data is residing in memory. Additional information (e.g., offset information) may be used to determine the location within the page (and thus the physical address in the memory) where the requested data is stored. After determining this location, the requested data may be forwarded to the requesting execution unit of processor 21, and may also be stored in one or more caches of cache hierarchy 29.

Flash memory 25 may also be used to store pages. In the embodiment shown, the storage capacity of flash memory 25 may be greater than that of RAM 26. Accordingly, flash memory 25 may be used to store copies of all the pages residing in RAM 26 at a given time, as well as a number of pages that are not residing in RAM 26. In some cases, if flash memory 25 has sufficient storage capacity, it may store all the pages of a virtual address space for computer system 20. In other embodiments, flash memory 25 may at least store a subset of the plurality of pages of the virtual address space.

Since flash memory 25 may be used to store pages of memory, it may be accessed by MMU 24 in the event of a page fault. A page fault may occur when a request for data intimated by an execution core of processor 21 does not find the data in any cache memory of cache hierarchy 29 or the page containing the data in RAM 26. If a page fault occurs and the page containing the requested data is located in flash memory 25, MMU 24 may load the page from flash memory 25 into RAM 26. If necessary, MMU 24 may also purge another page from RAM 26 in order to free the necessary storage space for the page containing the requested data. Thus, in contrast to computer systems that do not include a flash memory in the main memory hierarchy, the page fault may be handled (by MMU 24 in this embodiment) without asserting an interrupt or invoking an I/O driver in order to access the page containing the requested data as may be required to retrieve the page from storage (such as storage unit 23). Accordingly, the ability of MMU 24 to load pages containing requested data from flash memory 25 into RAM 26 without requiring an access of storage unit 23 may significantly reduce the performance penalty that may be associated with page faults.

As noted above, computer system 20 includes an I/O hierarchy that may in turn include I/O controller 22 and storage unit 23. In the embodiment shown, I/O controller 22 may be a device that provides an interface between processor 21 and one or more peripheral buses. At least one peripheral bus 221 may be used to couple storage unit 23 to I/O controller 22. Peripheral bus 221 may be one of a number of different types of buses, including an ATA (advanced technology attachment) bus, an SATA (serial ATA) bus, a Universal Serial Bus (USB), IEEE 1394 (i.e. 'Firewire') bus, or any other suitable type of bus. In various embodiments, I/O controller 22 may be configured to provide interfaces for some or all of these types of buses, and thus may be used to provide an interface for various peripherals that may be coupled to these buses. Furthermore, I/O controller 22 may also provide an interface for other buses not explicitly or implicitly mentioned here, and thus for peripheral devices that may be attached to such buses.

Storage unit 23 may be one of a number of different types of storage devices. In one embodiment, storage unit 23 may be a hard disk drive. In another embodiment, storage unit 23 may be an SSD that includes flash memory. Storage unit 23 may also be implemented in a RAID (redundant array of inexpensive drives) configuration. In general, storage unit 23 may be any type of storage unit that may be used to provide bulk storage for computer system 20, including times that computer system 20 is not operating and/or powered up.

In the embodiment shown, accesses of data stored in storage unit 23 may require the invoking of driver software. An access of data stored in storage unit 23 due to a page fault may also be associated with an interrupt. Accordingly, if a page fault occurs and a page containing the requested data is not found in either flash memory 25 or RAM 26, then an interrupt may be asserted to processor 21 and an I/O driver may be invoked in order to enable the page to be loaded from storage unit 23. As used herein, the term 'I/O driver' may refer to any type of driver software or similar software routine that may be used to access a device coupled to an I/O bus through an I/O interface. In terms of latency, asserting an interrupt and invoking an I/O driver may add a significant amount overhead in the handling of a page fault. However, this performance penalty may be eliminated for at least some page faults by storing pages in flash memory 25, which may enable the handling of page faults by MMU 24 as discussed above.

Computer system 20, in the embodiment shown, also includes a service processor 62, which may perform various functions that are not directly related to the processing of data and execution of instructions by processor 21. Additional details regarding some of these functions will be provided below.

Figure 3:
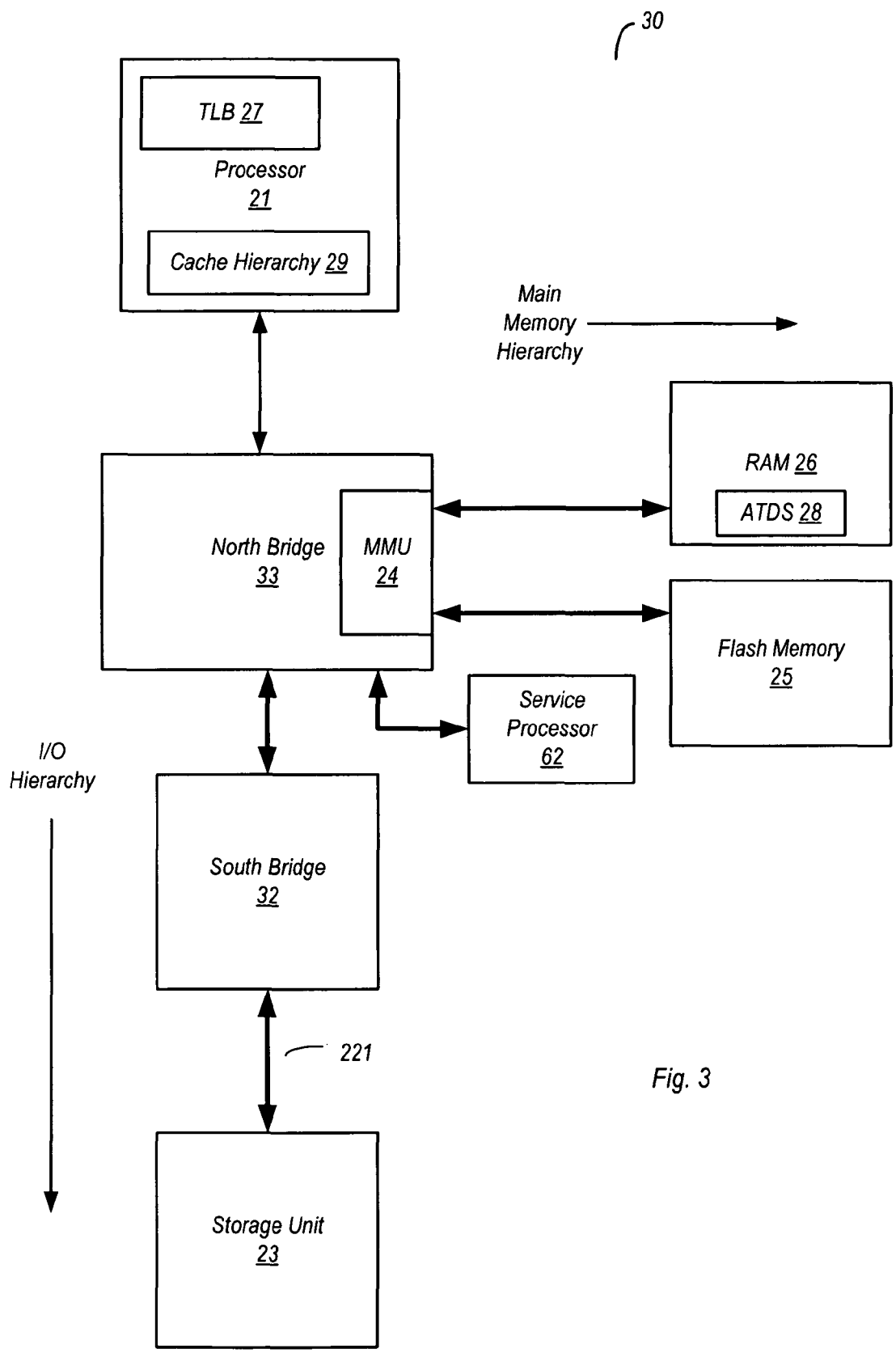
FIG. 3 is a block diagram of another embodiment of a computer system.

FIG. 3 is a block diagram of another embodiment of a computer system. In this particular embodiment, computer system 30 utilizes a system architecture including a integrated memory controller hub, or north bridge 33 and an I/O controller hub, or southbridge 32. In the embodiment shown, north bridge 33 is coupled directly to processor 21, while south bridge 32 is coupled to processor 21 through north bridge 33. In this particular embodiment, the main memory hierarchy includes north bridge 33 (which includes MMU 24), flash memory 25 and RAM 26. The I/O hierarchy in this embodiment includes south bridge 32 and storage unit 23.

As previously noted, north bridge 33 in this embodiment includes memory management unit 24, and thus may provide the same memory control functions as discussed above with reference to the embodiment shown in FIG. 2. Although not explicitly shown, north bridge 33 may also be coupled to a video card or other type of video processing unit, and may thus provide an interface for a display to processor 21. South bridge 32 may provide functionality similar to that of I/O controller 22 discussed above in reference to FIG. 2. Furthermore, south bridge 32 may provide bus interfaces for a number of different types of peripheral buses, including (but not limited to) any of the buses discussed above that may also be coupled to I/O controller 22 of FIG. 2.

In the embodiment shown, a page fault may be handled in a manner similar to that discussed above. If a page containing requested data is not stored in RAM 26 (which may thereby generate a page fault), MMU 24 may load the page from flash memory 25 if it is stored therein. If it is determined that the page containing the requested data is not stored in flash memory 25, the page may be loaded from storage unit 23. Similar to the embodiment above, retrieving data from storage unit 23 may require asserting an interrupt and invoking driver software for communications therewith. Accordingly, storing pages in flash memory 25 may provide enhance the performance of computer system 30 by avoiding the need to access storage unit 23 for at least some page faults.

Figure 4:
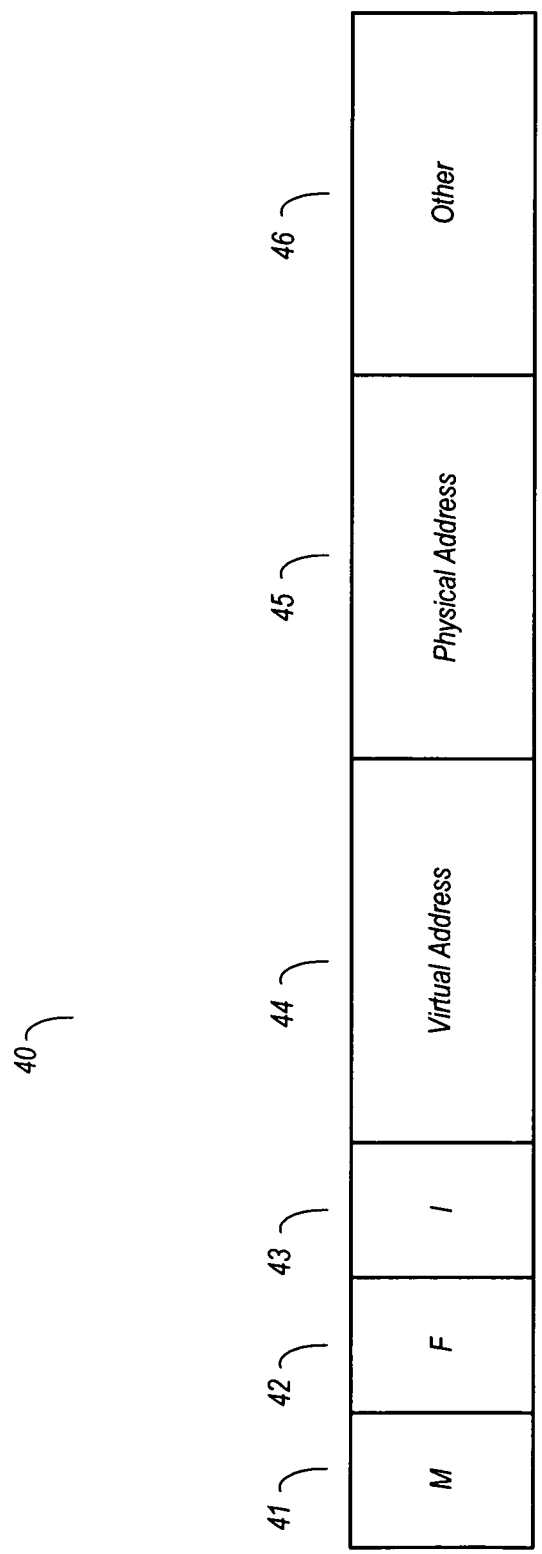
FIG. 4 is a diagram illustrating an entry in one embodiment of an address translation data structure.

Turning now to FIG. 4, a diagram illustrating an entry in one embodiment of an address translation data structure. As noted above, RAM 26 in computer systems 20 and 30 discussed above may store ATDS 28 during operation. As further noted, ATDS 28 may be a page table or TSB having a plurality of entries that provide information pertaining to pages of the virtual address space. In the embodiment shown, ATSD entry 40 (hereinafter 'entry 40') is an exemplary entry for one embodiment of ATDS 28, and may include a number of different fields that various information regarding various aspects of a given page.

In the embodiment shown, fields 41, 42, and 43 may each provide information regarding the storage location of a corresponding page. Field 41 ('M') may indicate whether or not the corresponding page resided in main memory (dynamic RAM, e.g., such as RAM 26). When set (e.g., a logic 1), field 41 may indicate that the corresponding page is residing in main memory. Field 41 for a given page may be set (e.g., toggled from a logic 0 to a logic 1) whenever that page is loaded into main memory from flash memory or from a storage unit (e.g., from storage unit 23). When the given page is evicted from main memory, field 41 may be reset (e.g., toggled from a logic 1 to a logic 0).

Field 42 ('F') may indicate whether or not the corresponding page resides in flash memory (e.g., flash memory 25). When set, field 42 may indicate that the page corresponding to the memory resides in flash memory. Field 42 may be set (e.g., toggled from a logic 0 to a logic 1) whenever a corresponding page is loaded from a storage unit, such as storage unit 23. Whenever the corresponding page is purged from flash memory, field 42 may be reset (e.g., toggled from a logic 1 to a logic 0). Since a page loaded from a storage unit may be written into both main memory and flash memory, the bits in fields 41 and 42 may both be in a set state (e.g., both logic 1's) concurrently.

Field 43 ('I') may indicate, when set (e.g., a logic 1) that the corresponding page does not reside in either of main memory or flash memory. In some embodiments, field 43 may be eliminated, since the information provided therein may also be provided based on fields 41 and 42 (e.g., if neither field is set, then the corresponding page does not reside in flash or main memory). A bit stored in field 43 may be set (in the embodiments that include this field) whenever a page is purged from both main memory and flash memory. More particularly, field 42 may be reset (i.e. toggled from a logic 1 to a logic 0) any time a corresponding page is loaded into main memory, flash memory, or both. Field 42 may be set (e.g., toggled from a logic 0 to a logic 1) any time the corresponding page has been purged from both main memory and flash memory, and thus no longer resides in either. In one embodiment, when processor 21 requests data and field 43 is in a set state (or fields 41 and 42 are both in a reset state) in the entry 40 corresponding to the page containing the data, an interrupt may be asserted, thereby causing the invoking of an I/O driver so that the page can be read from storage unit 23.

When processor 21 requests data, if the data is not cached within cache hierarchy, MMU 24 may search ATDS 28 in RAM 26 to determine if the page containing the requested data is stored in memory. In this particular embodiment, MMU 24 may search by virtual address, as processor 21 may provide virtual address information corresponding to the requested data. In one embodiment, the virtual address field in this embodiment, field 44, may only include a portion of the virtual address. For example, since entry 40 in this embodiment corresponds to a page of memory, field 44 may include only a certain number of the most significant bits that are common to all virtual addresses within the page.

If an entry 40 corresponding to the page is found, MMU 24 may examine fields 41, 42, and 43. If the bit in field 41 is set, MMU 24 may then read the physical address from field 45. The physical address may indicate a first address of a contiguous address space in RAM 26 wherein the page corresponding entry 40 is located. In addition to providing virtual address information, processor 21 may also provide offset information to MMU 24 when asserting a request for data. The offset information may be combined with the physical address information stored in field 45 to generate the complete physical address for the data word associated with the request. Upon generation of the physical address for the requested data word, MMU 24 may access the data from RAM 26 and provide it to processor 21.

It should be noted that the virtual and physical address fields (fields 44 and 45, respectively) discussed herein are exemplary, and thus the discussion above is not limiting. A wide variety of schemes for mapping and translating virtual and physical addresses are possible and contemplated. Accordingly, the variations in possible embodiments of entry 40 are intended to encompass any suitable address translation scheme in order to provide information mapping virtual addresses to corresponding physical addresses.

If it is determined by MMU 24 that field 41 is not set (thereby indicating that the data is not stored in RAM 26, and thus, a page fault), field 42 may be examined to determine if the page corresponding to entry 40 is store in flash memory 25. If field 42 is set, indicating that the page containing the requested data is stored in flash memory 25, MMU 24 may locate the page in flash memory 25 and load it into RAM 26. MMU 24 may also provide an indication to processor 21 that a page fault has occurred. In addition, MMU 24 may also provide information to processor 21 indicating that the load into RAM 26 of the page containing the requested data has been completed. In some embodiments, MMU 24 may retrieve the requested data from the page and provide it to processor 21 so that it may be loaded into one or more cache memories of cache hierarchy 29.

Subsequent to MMU 24 loading the page from flash memory 25, processor 21 may repeat the request. The requested data may then be provided to an execution core of processor 21 either from a cache memory (if the data was loaded into a cache) or from RAM 26 (if the data was not loaded into a cache).

It is noted that both fields 41 and 42 may both be in a set state at the same time, since pages stored in flash memory 25 may also be stored in RAM 26. Accordingly, MMU 24 may be configured to ignore the contents of field 42 if field 41 is set, since this field indicates, when set, that the page containing the requested data is already in RAM 26 and thus does not need to be loaded from flash memory 25.

In the embodiment shown, entry 40 determines that a page does not reside in either RAM 26 or flash memory 25 when the bits of neither of fields 41 or 42 are set. In some embodiments, MMU 24 may make this determination by examining field 43, in which a bit may be set when the corresponding page does not reside in either in RAM 26 or flash memory 25. Other embodiments of entry 40 may be implemented without the use of field 43, since fields 41 and 42 may provide sufficient information as to whether or not a page corresponding to the entry is stored in RAM 26 and/or flash memory 25. If MMU 24 determines that the bits of neither of fields 41 or 42 are set the page may be accessed and loaded into RAM 26 and flash memory 25 from storage unit 23. As noted above, accessing a page from storage unit 23 may require asserting an interrupt to processor 21 and invoking I/O driver software in order to access storage unit 23 via peripheral bus 221.

In various embodiments, entry 40 may include one or more additional fields of information (shown here as a single field, 'Other', field 46). Such additional information may include (but is not limited to) a processor ID associated with the page, fields to indicate whether or note any of the data within the page is cached, information indicating when the page was loaded into RAM 26, information indicating the most recent access of one or more data words contained in the corresponding page, and so forth.

In some embodiments, information stored in one or more fields represented by field 46 may be used to determine which pages may be purged if necessary to free memory space to load another page into RAM 26. For example, if such information in an entry 40 indicates that the corresponding page or data contained therein is associated with a critical system process, that page may be retained in RAM 26, while pages associated with non-critical processes may be purged if necessary to free memory space. In another example, if such information indicates that no data within a given page has been accessed recently relative to data in other pages, that page may be a candidate for purging from RAM 26 if the memory space is required for another page. In general, a wide variety of information may be stored in fields represented here by field 46. Alternatively, embodiments are possible and contemplated wherein no such extra fields are provided in entry 40.

Information stored in one or more fields represented by field 46 may also be used to indicate whether pages are 'dirty', i.e. pages that have been modified subsequent to being loaded from a storage unit. For example, an embodiment is possible and contemplated including a field indicating whether or not a corresponding page in main memory is dirty, and a field indicating whether or not the corresponding page in flash memory is dirty. This information may also be used to determine certain pages are purged from main memory or from flash memory. For example, if it is necessary to free up space to write a new page into main memory, a dirty page may be purged from the main memory and written back into flash memory, if space permits. Similarly, if storage space is needed in flash memory, a dirty page may be purged therefrom and written back to disk storage. In some cases, if there is no room to write back a dirty page from main memory into flash memory (e.g., when all the pages that may be purged from flash are dirty), the dirty page may be written from main memory into disk storage (with some intermediate buffering possible). Thus, in various embodiments, MMU 24 may access fields in an entry 40 that indicate whether a corresponding page is stored in main memory and is dirty, and/or stored in flash memory and is dirty, and may use this information to determine if the page is a candidate to be purged in order to free up space for another page.

Figure 5:
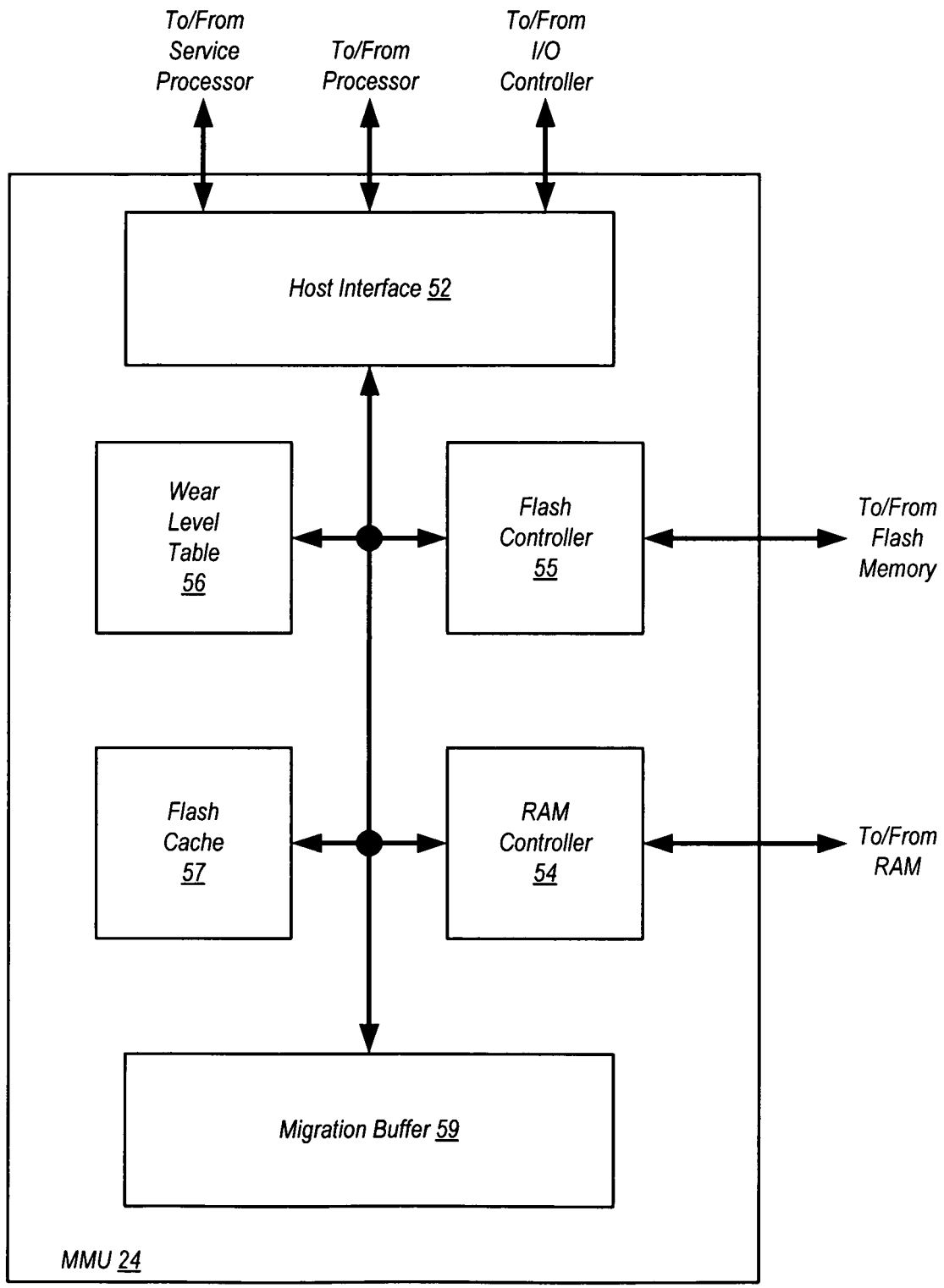
FIG. 5 is a block diagram of one embodiment of a memory management unit.

FIG. 5 is a block diagram of one embodiment of a memory management unit. In the embodiment shown, MMU 24 includes a host interface 52, which may be coupled to an I/O controller (e.g., I/O controller 22 of FIG. 2), a processor (e.g., processor 21 of FIG. 2), and a service processor (e.g., service processor 62 of FIG. 2). Host interface 52 may provide routing for communications from these devices to and from MMU 24. Various functional units with MMU 24 may also be coupled to host interface unit 52. In this embodiment, these functional units include RAM controller 54, flash controller 55, wear level table 56, flash cache 57, and migration buffer 59. In other embodiments of MMU 24, these various functional units may be implemented in different arrangements. Furthermore, the functionality provided by MMU 24 may be different in embodiments other than that which is shown here.

RAM controller 54 in this embodiment may be coupled to a main memory (e.g., RAM 26 of FIG. 2), and may provide a number of different functions associated with accessing the memory for read and write operations. Data may be conveyed through RAM controller 54 to RAM 26 during a write operation. Similarly, data may be conveyed from RAM 26 through RAM controller 54 during a read operation. RAM controller 54 may also be configured to assert various control signals (e.g., read enable, write enable, row address strobe, column address strobe) that may be required for operations that read from or write to RAM 26.

In the embodiment shown, RAM controller 54 may be configured to access RAM 26 in order to search for entries 40 of an ATDS 28. Responsive to a request for data from received by MMU 24 from processor 21, RAM controller 54 may search the entries 40 of ATDS 28 for an entry that corresponds to a page containing the requested data. In one embodiment, processor 21 may provide virtual address information when asserting a memory request. RAM controller 54 may receive this virtual address information and may conduct a search of ATDS 28 based thereon. In some cases, ATDS 28 may include an entry for each page of the entire virtual address space utilized by the computer system in which it is implemented.

Once an entry corresponding to a page containing the requested data is found in ATDS 28, RAM controller 54 may determine where the page corresponding thereto resides. RAM controller 54 may make such a determination by examining one or more of fields 41, 42, and 43 of entry 40. In one embodiment, RAM controller 54 may initially read field 41, which may be used to indicate whether or not the page containing the requested data resides in RAM 26. If the bit in field 41 indicates that the page resides in RAM 26, RAM controller 54 may respond by locating the requested data word (or words) within the page and by providing the data word(s) to processor 21. In some embodiments, processor 21 may, after receiving the data from MMU 24, store the data word(s) in one or more cache memories of cache hierarchy 29.

If the bit in field 41 is not set, RAM controller 54 may examine field 43. If the bit in field 42 is set, indicating that the corresponding page is located in flash memory 25, RAM controller 54 may provide an indication or command to flash controller 55 in order to cause the page to be retrieved from flash memory 25 for loading into RAM 26.

As discussed above with reference to FIG. 4, field 43 may indicate, when a bit therein is set, that a page corresponding to the entry 40 does not reside in either RAM 26 or flash memory 25. As further noted above, some embodiments may dispense with field 43, instead using fields 41 and 42 to determine that a page containing the requested data is not stored in RAM 26 or in flash memory 25. Accordingly, if RAM controller 54 determines that the corresponding page does not reside in either RAM 26 or flash memory 25, an indication may be provided to processor 21, I/O controller 22, or both. The indication provided may invoke an interrupt, thereby causing processor 21 to begin execution of an interrupt routine. Processor 21 may further respond by causing an I/O driver to be invoked. After invoking the interrupt and the I/O driver, the requested page may be loaded from storage device 23 into RAM 26 through RAM controller 54 and into flash memory 25 through flash controller 55.

In some embodiments, RAM controller 54 may be configured to read fields 41, 42, and 43 of entry 40 in parallel, which may provide a quicker determination as to where the corresponding page may be stored. In other embodiments, these fields may be read in various sequences (e.g., field 41 may be read first, followed by field 42). Furthermore, as noted above, field 43 may not be present in all embodiments.

In embodiments in which processor 21 includes a TLB (e.g., TLB 27 of FIG. 2), it may not be necessary to search for an entry in ATDS 28. In such embodiments, the assertion of a memory request may cause a search of TLB 27. If corresponding address translation information is found in TLB 27 (i.e. a TLB hit), the information may be provided to RAM controller 54 in order to enable the corresponding page to be located without accessing ATDS 28. In one embodiment, a hit in TLB 27 may result in RAM controller 54 receiving physical address information to enable the corresponding page to be located in memory, along with additional addressing information (e.g., an offset) in order to enable the requested data word(s) to be located and provided to processor 21. In other embodiments, both the physical and virtual address information may be provided to RAM controller 54. For example, the virtual address information may be used in such an embodiment in order to enable RAM controller 54 to verify that the physical address is correct.

RAM controller 54 may provide information to flash controller 55 if it determines that a page containing requested data is not stored in RAM 26 (i.e. a page fault) but is stored in flash memory 25. Flash controller 55 may respond to receiving this indication by locating the requested page in flash memory 25 and providing it to be loaded by RAM controller 55 into RAM 26. In this particular embodiment, MMU 24 includes a migration buffer 59, which may provide temporary storage of pages that are being transferred between RAM 26, flash memory 25 and storage unit 23. Migration buffer 59 in the embodiment shown is a buffer memory that is hierarchically between RAM 26 and flash memory 25, and may be implemented using any suitable memory technology (DRAM, SRAM, etc.). As an alternative, some embodiments may include a fast RAM buffer that is external to MMU 24 and is hierarchically between RAM 26 and flash memory 25. In either case, migration buffer 59 (or the alternative RAM buffer) may be used to store a backup store of pages that are missing from RAM 26. Such pages may include pages that are to be loaded into RAM 26 responsive to a page fault, and/or pages that are to be purges from RAM 26 and/or flash memory 25.

In the embodiment shown in FIG. 5, flash controller 55 may initially load a requested page (e.g., a page that triggered a page fault) into migration buffer 59. Upon completing the load of the requested page into migration buffer 59, flash controller 55 may also provide an indication of the same to RAM controller 54. Alternatively, in some embodiments, flash controller 55 may provide the requested page directly to RAM controller 54, which may then load the page into RAM 26. In some embodiments, migration buffer 59 may be implemented using one of a number of different types of RAM technologies that may allow for relatively fast writes thereto and reads therefrom.

Embodiments are also possible and contemplated wherein both a direct load (page provided from flash controller 55 directly to RAM controller 54) and a buffered load (page provided first to migration buffer 59 and subsequently to RAM controller 54) are also possible and contemplated. In such embodiments, RAM controller 54 and flash controller 55 may perform a handshake operation with each other to determine which type of load is to be performed for a given instance of a page load.

In general, migration buffer 59 (or an alternative RAM buffer) may be used for temporary storage of pages that are to be swapped into and out of RAM 26. As noted above, pages that are being loaded from flash memory 25 into RAM 26 may be temporarily stored in migration buffer 59. Similarly, RAM controller 54 may also store pages that are to be purged from RAM 26 in migration buffer 59. When buffering a page that is being purged, RAM controller 54 may store the page into migration buffer 59, providing an indication to flash controller 55 when the storing of the page is complete. Flash controller 55 may then retrieve the page from migration buffer 59 and load it into flash memory 25.

Writing a page that has been purged from RAM 26 back into flash memory 25 may ensure that the page includes any changes/updates that occurred up to the time it was purged from RAM 26. Such a modified page may also be written back to storage unit 23, if desired, although such a write need not interfere with other accesses to RAM 26 or flash memory 25. Each of these various operations that involve the transfer of pages between RAM 26, flash memory 25, and storage unit 23 may be aided by the temporary storage that may be provided by migration buffer 59. For example, if flash controller 55 is busy when RAM controller 54 is purging a page from RAM 26, it may load the page into migration buffer 59 and continue with other operation instead of having to wait for flash controller 55 become available to receive the page.

Flash controller 55 may also be configured to purge pages from flash memory 25 and may initiate a writeback of such pages to storage unit 23. Since flash memory 25 may be insufficient to store all pages of a virtual address space in some embodiments, flash controller 54 may be configured to determine when pages should be purged from flash memory 25 to make room for others to be stored therein. Flash controller 54 may make a determination of which pages, if any, to purge from flash memory based on various factors, such as those that have least recently been accessed (i.e. least recently used), least recently been loaded, or any other suitable factor for determining when a page may be purged from flash memory 25.

Flash controller 55 may also be configured to prevent some particular pages from being purged from flash memory 25. For example, flash memory 25 may be used to store a boot image for the computer system in which it is implemented. Accordingly, flash controller 55 may prevent these pages from being purged from flash memory 25 in order to enable shorter boot times. Pages storing instructions and data related to system critical processes may also be prevented from being purged from flash memory 25 by flash controller 55. However, although certain pages may be prevented from being purged from flash memory 25, flash controller 55 may nevertheless be configured to allow these pages to be updated as necessary. For example, if an operating system update alters a page associated with a boot image, flash controller 55 may cause this page to be updated, either by replacing the entire page with an updated version, or by replacing the data that was updated.

In the embodiment shown, MMU 24 (e.g., via RAM controller 54) may also determine if pages stored in RAM 26 or flash memory 25 are dirty. Such determinations of whether or not a given page is dirty may also be factored in when considering which pages are to be purged in order to free up space for new pages to be loaded. For example, consider a situation wherein a page fault necessitates purging a page from RAM 26 so that another page may be loaded therein from storage unit 23. MMU 24 may determine if any pages stored in RAM 26 are dirty at the time the page fault occurs. If MMU 24 determines that one or more pages in RAM 26 are dirty at the time the page fault occurs, and it is necessary to free up space to store the page which triggered the page fault, then MMU 24 may free up the necessary space by evicting a dirty page from RAM 26. When multiple dirty pages are present in RAM 26, MMU 24 may use additional information to determine which of the dirty pages is to be purged therefrom. For example, MMU 24 may determine which of a plurality of dirty pages stored in RAM 26 is the least recently used. Accordingly, MMU 24 may free up space in RAM 26 by choosing to evict a page that is both dirty and is the least recently used (i.e. least recently accessed) of a number of dirty pages. When a given page is evicted from RAM 26, MMU 24 may also access ATDS 28 and reset the 'M' field (e.g., field 41 of FIG. 4) in order to indicate that the page no longer resides in main memory.

The determination of whether or not stored pages are dirty may also be used as criteria to determine when pages are to be purged from flash memory 25. When a page fault occurs, it may be necessary to free up space in flash memory 25. More particularly, it may be necessary to free up space so that the page that triggered the page fault may be loaded into flash memory 25 as well as into RAM 26. In some embodiments, when a page is evicted from RAM 26 (which may also occur due to a page fault), that page may be written back to flash memory 25. If either of these situations necessitates the freeing up of space in order, MMU 24 (via flash controller 55) may determine which (if any) pages stored in flash memory 25 is dirty. If one or more pages stored in flash memory 25 are dirty, MMU 24 may select one of these pages to be purged from flash memory 25 in order to free up space for the storage of another page. If more than one page stored in flash memory 25 is dirty, MMU 24 may utilize additional criteria to determine which of the dirty pages is to be purged. For example, MMU 24 may employ the same criteria as discussed above with respect to RAM 26, i.e. selecting for eviction from flash memory 25 the least recently used page from a plurality of dirty pages. MMU 24 may then purge this page from flash memory 25, while writing the page back to storage unit 23. When a page is purged from flash memory 25, MMU 24 may also access the corresponding entry 40 in ATDS 28, resetting the 'F' field (field 42 in FIG. 4) to indicate the page no longer resides in flash memory 25. If the corresponding entry 40 also includes an 'I' field (field 43 in FIG. 4), and the page is not stored in RAM 26, MMU 24 may also set the 'I' field (indicating the entry refers to an invalid page, i.e. a page that is not stored in either RAM 26 or flash memory 25). If field 40 also includes a field to indicate whether or not corresponding page is dirty, MMU 24 may reset this field after the page has been written back to storage unit 23.

In the embodiments discussed above, the writing back of dirty pages to storage unit 23 may be an event driven process. That is, in the embodiments discussed above, dirty pages may be written back to storage unit 23 responsive to a page fault or other event which may necessitate the freeing up of storage space within flash memory 25 and/or RAM 26. However, in some embodiments, the writing back of dirty pages from flash memory 25 (or from RAM 26) to storage unit 23 may be performed on a periodic basis. That is, even if a dirty page stored in flash memory 25 or RAM 26 is not associated with a page fault (and is not purged or to be purged), a copy of the page may be written back to storage unit 23 on a periodic basis in order to ensure coherency between RAM 26, flash memory 25, and storage unit 23. Whenever a dirty page is written back to storage unit 23 and coherency is achieved between flash memory 25 and storage unit 23 (and RAM 26, if the page is also stored therein), any dirty bit or indication in an entry 40 may be reset to indicate that the page is no longer dirty. Various embodiments may also combine the event driven writeback of dirty pages to storage unit 23 with the periodic writeback of dirty pages to storage unit 23.

In the embodiment shown, MMU 24 includes a wear level table 56, which may be used to store historical information as to where pages have been stored in flash memory 25. Since flash memory cells may not have unlimited lifetimes, it may thus be necessary to ensure that storage locations are chosen such that the wear of cells across the entirety of flash memory 25 wear relatively evenly. In various embodiments of a computer system (e.g., computer systems 20 and 30 of FIGS. 2 and 3, respectively), a service processor 62 may be configured to determine locations in flash memory 25 to which pages may be stored based on the information stored on wear table 56. Flash controller 55 may be configured to update wear level table 56 whenever a page is written to flash memory 25. Service processor 62 may access wear level table to determine a next location where a page may be written in flash memory 25, and may provide this information to flash controller 55. In this manner, the wear of flash memory 25 may be distributed relatively evenly. Embodiments are also possible and contemplated wherein flash memory 25 is implemented with flash memory technology that allows for a sufficient number of writes that it may not be necessary to utilize wear level table 56 or implement any wear leveling routines. Such embodiments may be made possible by advances in flash memory technology, which may allow increasingly larger numbers of write cycles.

In some embodiments, the functions discussed above that are associated with wear level table 56 may instead be performed by a host processor (e.g., processor 21 of FIG. 2) in conjunction with a read-only memory (ROM). The ROM may be various types of ROM such as an EEPROM (electrically erasable read only memory), and may store information such as that stored in wear level table 56. The host processor may access the ROM when determining where in flash memory 25 a new page (i.e. a page loaded from a storage unit coupled to an I/O bus) is to be stored. In general, any function that is performed by service processor 62 in the embodiment shown may also be performed, in other embodiments, by host processor 21, which may be augmented by other components (e.g., the aforementioned ROM).

MMU 24 may also include a flash cache 57, which may be used to cache certain information involved with the handling of pages. In one embodiment, flash cache 57 may be used to store pages that were recently purged from flash memory 25. In another embodiment, flash cache 57 may be configured to store data from requested pages, or other information. In general, flash cache 57 may be used to cache any information that may be useful for operations involving flash controller 55.

Figure 6:
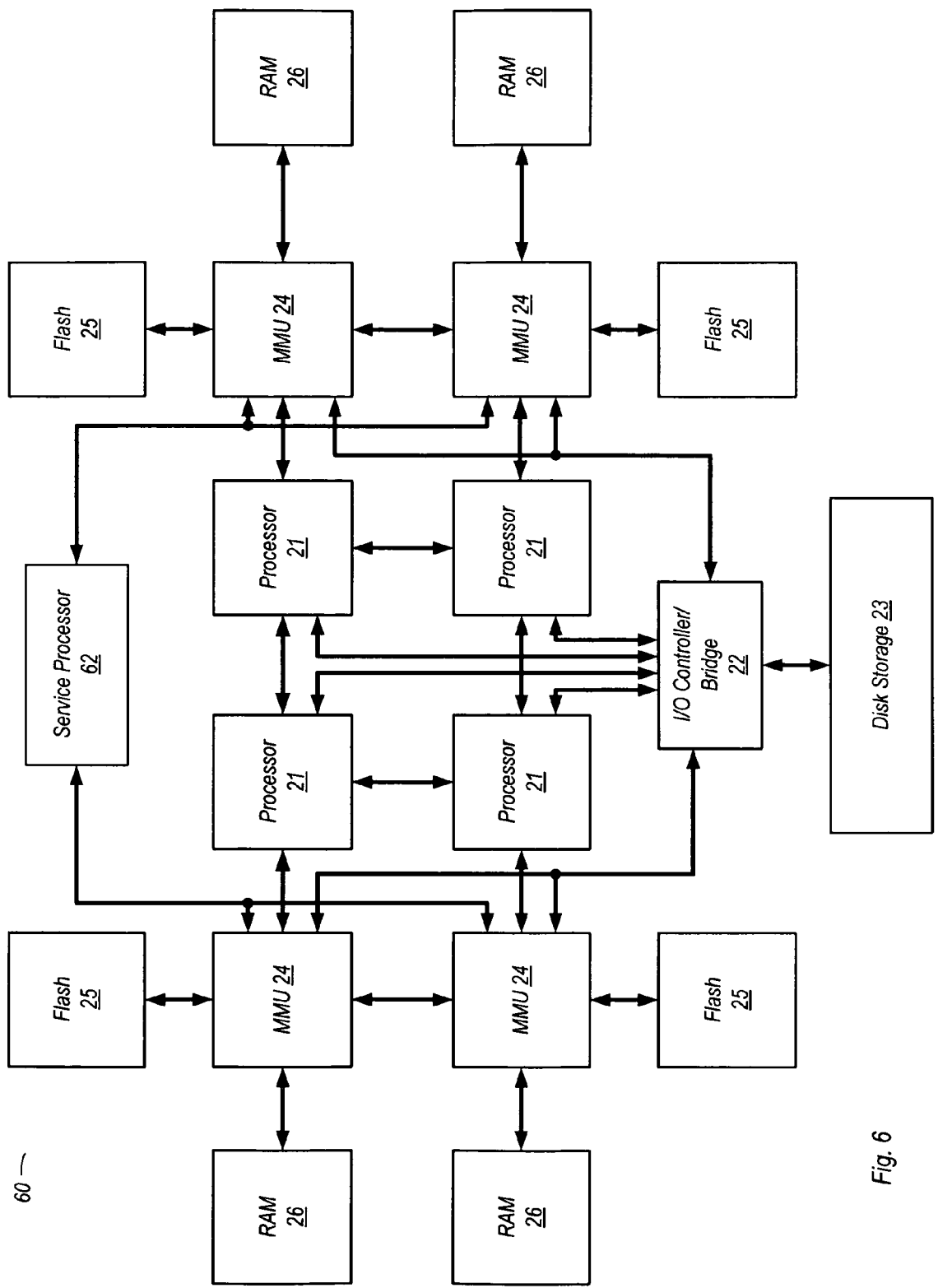
FIG. 6 is a block diagram of one embodiment of a multi-processor computer system.

Turning now to FIG. 6 a block diagram of one embodiment of a multi-processor computer system is shown. In the embodiment shown, computer system 60 includes four processors 21, each of which is coupled to a corresponding MMU 24. Each MMU 24 is coupled to corresponding instances of a flash memory 25 and a RAM 26. Computer system 60 also includes a shared I/O controller 22, shared disk storage unit 23, and a shared service processor 62.

Computer system 60 may be configured to handle page faults in a manner similar to that described above for computer systems 20 and 30 of FIGS. 2 and 3. More particularly, each flash memory 25 may be used to store page that may be loaded into a RAM 26 responsive to a page fault, without causing an interrupt, the invoking of an I/O driver, or the access of the page from disk storage 23.

In some embodiments, each instance of RAM 26 and flash memory 25 may be private with respect to their corresponding MMU 24 and processor 21 (i.e. not accessible by other ones of processors 21 and MMU's 24). In other embodiments, each RAM 26 and flash memory 25 may be shared and thus accessible by any of processors 21 or MMU's 24. Some embodiments may also utilize a scheme wherein a portion of each RAM 26 and each flash memory 25 is shared and a portion of each is private.

In the embodiment shown, service processor 62 may provide functionality related to wear leveling in each of the flash memories, as described above. Furthermore, service processor 62 may perform other functions required to coordinate communications between various processors 21, MMU's 24, and so forth.

Figure 7:
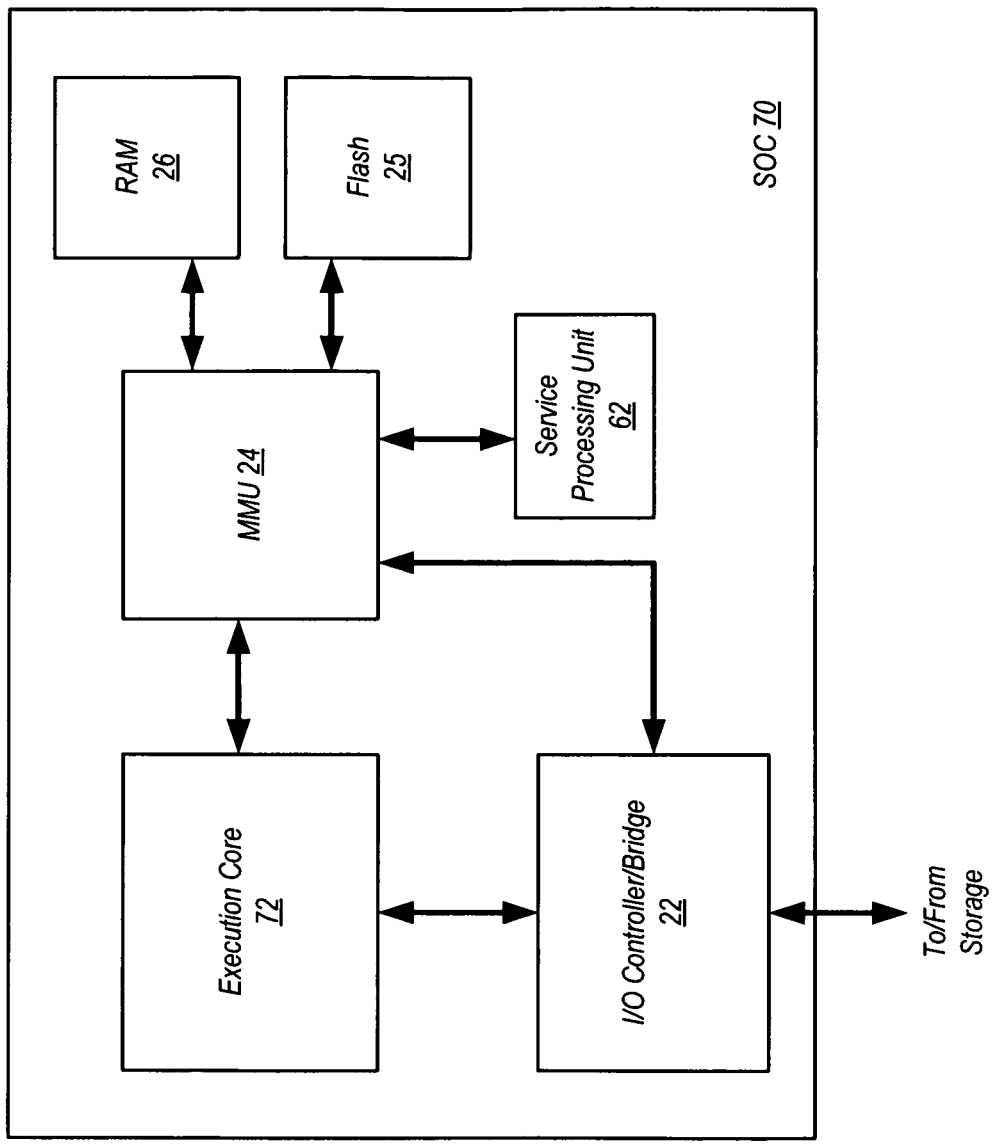
FIG. 7 is a block diagram of one embodiment of a system on a chip.

FIG. 7 is a block diagram of one embodiment of a system on a chip. System on a chip (SOC) 70 in the embodiment shown includes an execution core 72 coupled to an MMU 24. SOC 70 also includes a RAM 26 and a flash memory 25 in the embodiment shown. In some embodiments, SOC 70 may also included interfaces for coupling to additional RAM and additional flash memory (not shown) to provide extra memory capacity.

In the embodiment shown, SOC 70 also includes an I/O controller 22, which may be coupled to a storage unit (off chip). SOC 70 may be configured to handle page faults in a manner similar to that of the various computer systems described above. More particularly, SOC 70 may handle a page fault by accessing a page from flash memory 25, if available, without invoking an interrupt or an I/O driver. Furthermore, in the embodiment shown, only if a page does not reside in either flash memory 25 or RAM 26 is the page accessed from an off-chip storage unit.

SOC 70 may also include a service processor unit 62 in the embodiment shown. Service processor unit may perform functions that include those discussed above with respect to wear leveling of flash memory 25.

While various embodiments of computer systems and systems on a chip have been described above, it should be noted that the disclosure is not limited to just these embodiments. The disclosure may apply to any system wherein page fault handling is performed as discussed above, wherein a flash memory may be included in the main memory hierarchy, and wherein interrupts and the invoking of I/O drivers may be avoided for the handling of such page faults.

Figure 8:
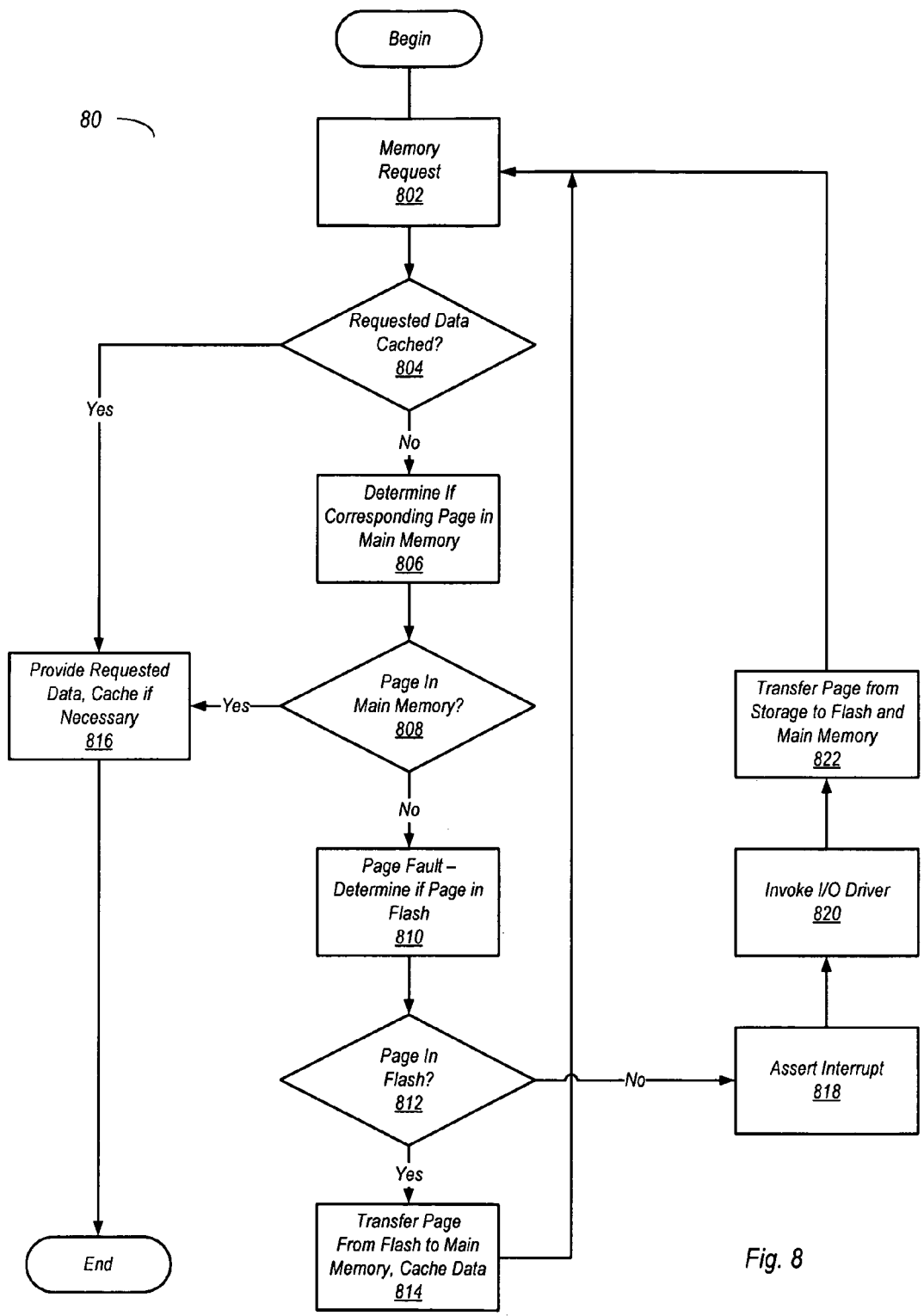
FIG. 8 is a flow diagram of one embodiment of a method for handling a page fault in a computer system.

Turning now to FIG. 8, a flow diagram of one embodiment of handling a page fault in a computer system is illustrated. In the embodiment shown, method 80 begins with a memory request (block 802). The memory request may be a request for access to data (e.g., data for operands, an instruction, or other type of information) to be used by an execution core of a processor.

Responsive to assertion of the request, one or more caches of a cache hierarchy may be searched. For example, a processor may search an L1 cache for the data, followed by a search of an L2 cache, and so on. If the requested data is located in one of the caches (block 804, yes), then the requested data may be provided to the execution core (block 816). In some cases, the data may also be written into a higher level cache if it was found in a lower level cache. For example, if a search of an L1 and L2 cache responsive to a request for data found the data in the L2 cache, the data may be written into the L1 cache in conjunction with satisfying the request.

If the data is not found in any cache of the cache hierarchy (block 804, no), then a determination may be made as to whether a page containing the requested data is stored in main memory (block 806). The main memory may be a random access memory, such as RAM 26 as discussed above. Determining whether or not a page containing the requested data resides in main memory may include accessing a data structure such as a page table or a TSB, which may contain entries (e.g., such as entry 40 discussed above) that each correspond to a page of a virtual address space. These entries may each include information indicating whether or not the page corresponding thereto resides in main memory. If the information in the entry indicates that the page containing the requested data is stored in memory (block 808, yes), then the data may be provided to the processor (and thus to an execution unit therein) and may also be cached (block 816).

If the entry corresponding to the page containing the requested data indicates that the page does not reside in memory (808, no), a page fault occurs, and an MMU (e.g., MMU 24 as discussed above) may determine whether or not the page resides in flash memory (block 810). In one embodiment, this determination may be made by reading the same entry in the data structure that was used to determine whether or not the page was residing in main memory. For example, as noted above in the discussion of FIG. 4, an entry may include fields that indicate whether or not a particular page resides in RAM, in flash, or neither. Accordingly, an MMU may examine the entry corresponding to the page to determine whether or not the page is in flash memory.

If it is determined that the page is located in flash memory (block 812, yes), the page may be transferred to main memory (block 814). After the transfer of the page has been completed, an indication may be sent to the processor and the memory request may be repeated (by returning to block 802). Since the page has been loaded into main memory, a repeat of the memory request may be performed without generating another page fault. In some embodiments, the requested may also be conveyed to the processor concurrent with providing an indication that the transfer of the page to main memory is complete. Thus, when the request is repeated, the requested data may be accessed from a cache instead of from main memory.

Since the flash is in the main memory hierarchy in the various embodiments described herein (and thus not part of the I/O hierarchy that includes e.g., disk storage), the handling of the page fault when the page resides in flash may be accomplished without asserting an interrupt or invoking an I/O driver. Computer systems that do no include a flash in the main memory hierarchy may be required to handle a page fault by asserting a processor interrupt and invoking an I/O driver in order to access the page that cause the fault from a storage unit.

If the MMU determines that the requested page does not reside in flash memory (block 812, no), then an access of the page from a storage unit (e.g., storage unit 23 in the embodiments discussed above) may be required. Responsive to determining that the page is not stored in flash, an interrupt may be asserted (block 818). Responsive to receiving the interrupt, a processor may invoke an I/O driver (block 820), which may be necessary for communication with a storage unit coupled to an I/O bus. As previously noted, a storage unit coupled to an I/O bus may be a disk storage unit, an SSD (which may utilize flash memory), or any other type of suitable device that may provide bulk storage. After establishing communications with the storage unit over the I/O bus, the page may be transferred from the storage unit into the flash memory and the main memory (block 822). When the transfer is complete, an indication may be sent to the processor, and the request may be repeated (block 802). In some cases, the indication may be sent concurrently with the writing of the requested data to the cache, thereby enabling the retry of the request to be satisfied by accessing the cache. If the data is not cached, the retry of the request may result in the data being access from main memory.

As previously noted, a significant performance penalty may be incurred when an interrupt is asserted and an I/O driver invoked to enable communications to such a storage unit over an I/O bus. The latency resulting from an access of a page from a storage unit may be one or more orders of magnitude greater than the latency resulting from an access of a page from flash memory in the main memory hierarchy, as described above. Accordingly, providing the flash memory in the main memory hierarchy and storing pages of a virtual address space therein may significantly reduce the performance penalty incurred from at least some page faults. Generally speaking, implementing greater the storage capacity of the flash memory may reduce the number of page faults that are required to access disk storage. In some embodiments, if the flash memory has sufficient capacity to store an entire virtual address space, all page faults may be handled by accessing a flash memory in the main memory hierarchy.

In addition to providing the ability to handle page faults without having to access a storage unit in the I/O hierarchy, implementing flash memory in the main memory hierarchy may also enable the main memory footprint to be reduced. When main memory is implemented using DRAM, it may consume a significant amount of power, and may also be generated a significant amount of heat. However, in conventional computer systems, it may nevertheless be desirable to implement main memory using a larger amount of DRAM in order to avoid the performance penalty resulting from page faults. However, utilizing flash memory in the main memory hierarchy as described above may enable the handling of page faults to be performed with a significantly lower performance penalty compared to conventional computer systems. Since the page faults may be handled faster by accessing the pages from the flash memory in the main memory hierarchy (instead of from a storage unit coupled to an I/O bus), the amount of DRAM may be reduced without a significant reduction in performance. Furthermore, reducing the amount of DRAM in a system may also reduce its power consumption and heat generation.

Although the various embodiments discussed above have used a virtual addressing scheme that includes paging, embodiments that perform similar functions based on a segmented virtual address space are possible and contemplated. Accordingly, variations of the systems and methods discussed above may be construed to encompass paged memory systems as well as segmented memory systems.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A computer system comprising:
at least one processor;
a memory management unit coupled to the at least one processor;
a random access memory (RAM) coupled to the memory management unit, the RAM being in a main memory hierarchy; and
a flash memory coupled to the memory management unit, the flash memory being in the main memory hierarchy, wherein the computer system is configured to store at least a subset of a plurality of pages in the flash memory during operation;
wherein responsive to a page fault, the memory management unit is configured to determine if a requested page associated with the page fault is stored in the flash memory and further configured to, if the page is stored in the flash memory, transfer the page into RAM without generating an interrupt and without invoking an input/output (I/O) driver;
wherein the computer system further includes a service processor configured to determine locations for storing pages in the flash memory based on a history of where pages have been previously stored in the flash memory as indicated in a wear level table in the memory management unit.

2. The computer system as recited in claim 1, wherein the computer system is configured to store a data structure in the RAM, the data structure including indications of which of a plurality of pages are stored in the RAM.

3. The computer system as recited in claim 2, wherein the data structure includes corresponding entries for each of the plurality of pages, wherein each entry a first bit used to indicate whether a corresponding one of the plurality of pages is stored in the RAM, and a second bit used to indicate whether the corresponding one of the plurality of pages is stored in the flash memory.

4. The computer system as recited in claim 2, wherein the data structure includes, for each page of the subset of the plurality of pages, address translation information indicating a mapping between a physical address of a page stored in the RAM and a virtual address of the page stored in the RAM.

5. The computer system as recited in claim 4, wherein the processor includes a translation lookaside buffer (TLB) configured to store address translation information, and wherein the computer system is configured to, upon a TLB miss, load corresponding address translation information from the data structure into the TLB.

6. The computer system as recited in claim 1, wherein the computer system is further configured to invoke an I/O driver and access the page from a storage drive if the requested page is not stored in either of the RAM or the flash memory.

7. The computer system as recited in claim 6, wherein the storage drive is coupled to an I/O bus.

8. The computer system as recited in claim 1, wherein the computer system includes:
a plurality of processors;
a plurality of memory management units, wherein each of the memory management units, wherein each of the memory management units is coupled to a corresponding one of the plurality of processors and further coupled to at least one other one of the plurality of memory management units;
a plurality of RAM banks, wherein each of the plurality of memory management units is coupled to one or more corresponding ones of the plurality of RAM banks; and
a plurality of flash memory banks, wherein each of the plurality of memory management units is coupled to one or more corresponding ones of the plurality of flash memory banks.

9. A method comprising:
a processor initiating a memory request in order to access data;
determining if a page containing the data is stored in a random access memory (RAM) coupled to a memory management unit, the RAM being in a main memory hierarchy;
if the page containing the data is stored in RAM, providing the data to the processor;
if the page containing the data is not stored in RAM, determining if the page containing the data is stored in flash memory coupled to the memory management unit, the flash memory being in the main memory hierarchy; and
if the page containing the data is stored in flash memory, transferring the page to RAM without generating an interrupt and without invoking an I/O driver, and repeating the memory request;
wherein the method further comprises determining locations for storing pages in the flash memory based on a history of where pages have previously been stored in the flash memory.

10. The method as recited in claim 9, further comprising accessing a data structure stored in RAM to determine if the page containing the data is stored in RAM.

11. The method as recited in claim 10, wherein the data structure includes, for each of a plurality of pages including the page containing the data, a first bit used to indicate whether a given one of the plurality of pages is stored in the RAM, and a second bit used to indicate whether the given one of the plurality of pages is stored in the flash memory.

12. The method as recited in claim 11, wherein the data structure includes, for each page of a subset of the plurality of pages, address translation information indicating a mapping between a physical address of a page stored in the RAM and a virtual address of the page stored in the RAM, wherein the subset of the plurality of pages are stored in RAM.

13. The method as recited in claim 12 further comprising accessing a translation lookaside buffer (TLB) in the processor responsive to the memory request, wherein the TLB is configured to store address translation information, wherein said accessing TLB comprises determining whether address translation information associated with the memory request is stored in the TLB, and wherein the method includes, if the address translation information is not stored in the TLB, transferring the address translation information from the data structure into the TLB.

14. The method as recited in claim 9 further comprising invoking an I/O driver and accessing the page containing the data from a storage drive coupled to an I/O bus responsive to determining that the requested page is not stored in either of the RAM or the flash memory.

15. A system comprising:
an execution core configured to generate a memory request;
a memory management unit coupled to the execution core;
an I/O controller coupled to the execution core; and
a random access memory (RAM) coupled to the memory management unit, the RAM being in a main memory hierarchy;
a flash memory coupled to the memory management unit, the flash memory being in the main memory hierarchy, wherein the system is configured to store at least a subset of a plurality of pages in the flash memory during operation;

wherein the memory management unit is configured to, responsive to a page fault, determine if a requested page associated with the page fault is stored in the flash memory and further configured to, if the page is stored in the flash memory, transfer the page into RAM without generating an interrupt and without invoking an I/O driver;

wherein the system further includes a service processor unit coupled to the memory management unit, wherein the service processor unit is configured to determine a location in the flash memory for storing each page of the subset, and wherein the service processor unit is configured to determine locations for storing pages in the flash memory based on a history of where pages have been previously stored in the flash memory.

16. The system as recited in claim 15, wherein system is configured to store a data structure in the RAM, the data structure including indications of which of a plurality of pages are stored in the RAM, wherein the data structure includes entries for each of the plurality of pages, wherein each entry a first bit used to indicate whether a corresponding one of the plurality of pages is stored in the RAM, and a second bit used to indicate whether the corresponding one of the plurality of pages is stored in the flash memory.

* * * * *